G. PARKER.
INDUCTION COIL AND RELATED PARTS.
APPLICATION FILED FEB. 9, 1914.

1,200,017.

Patented Oct. 3, 1916.

WITNESSES
M. B. Williams
J. A. Bridges

INVENTOR
George Parker

UNITED STATES PATENT OFFICE.

GEORGE PARKER, OF FOXBORO, MASSACHUSETTS.

INDUCTION-COIL AND RELATED PARTS.

1,200,017.   Specification of Letters Patent.   Patented Oct. 3, 1916.

Application filed February 9, 1914. Serial No. 817,655.

*To all whom it may concern:*

Be it known that I, GEORGE PARKER, a citizen of the United States, residing in Foxboro, in the county of Norfolk and State of Massachusetts, have invented new and useful Improvements in Induction-Coils and Related Parts.

My invention relates to improvements in induction coils and related parts where same are used in conjunction with a plurality of operating current sources, as in the modern ignition systems for internal combustion engines on vehicles, boats and for other purposes.

The object of my improvements is to secure better balance between condenser capacity, operating current and the parts coöperating with them. It has hitherto been the practice to provide one condenser capacity for each coil, and if there is but one kind of operating current, balance was obtained and maximum efficiency secured. It is the almost universal custom now to use more than one source of current, usually battery and magneto, each with characteristics variously affecting the condenser. Coil efficiency is therefore lessened in proportion as the balance of the condenser with the operating current is disturbed.

I attain maximum coil efficiency by providing condenser capacity suitable for each current used, connected as illustrated and described, so that perfect balance of condenser capacity and operating current is constantly maintained.

Figure 1:
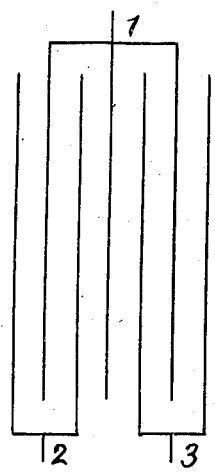
Figure 2:
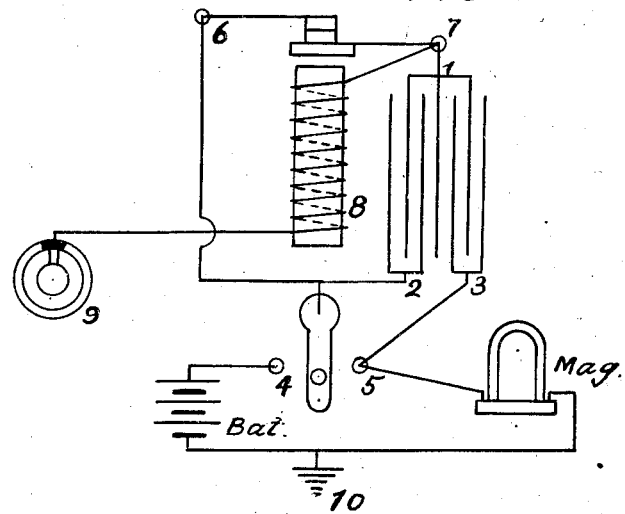

Referring to drawings, Figure 1 is a three terminal, two capacity condenser. 1 is one pole or side, 2 is the opposite pole or side of part of its capacity, 3 is the opposite pole or side of the remainder of its capacity: 1 and 2 representing one capacity, 1 and 3, another capacity. Fig. 2 is the primary circuit in an ignition system using a vibrator coil with battery and magneto and selective switch. This view shows the improved condenser connections. The secondary circuit is omitted as it has only an electrical relation to the improvement.

The electrical action is as follows: In Fig. 2, when the switch is thrown to 4, battery current flows through the vibrator 6—7 to primary coil 8, which operates the vibrator, through timer 9 to ground 10, back to battery B, thus completing the primary circuit. During this cycle of operation, condenser capacity 1 and 2 is in action across the vibrator or circuit breaker 6—7. When the switch is thrown to 5, magneto current operates the coil as described and condenser capacities 1—2 and 1—3 are thrown in parallel with each other, thus furnishing capacity suitable for magneto current.

The method employed in making the condenser is:—One side of the condenser, as represented by 1 in Fig. 1, consists of one length of tinfoil. The other side, 2—3 in Fig. 1, is composed of two lengths of foil to furnish required capacities, with the usual interleaves of dielectric. The condenser is then rolled into desired form and size. While only two capacities are shown, more could be obtained if desired.

To obtain simultaneous change of capacity and operating current, I employ a switch as shown. I do not limit my invention to that particular method, as the same result could be obtained by coupling the capacity relating to any current, direct to that particular current.

I am aware that a plurality of condenser capacities has been used for a variety of purposes prior to my invention but in no case known to me has a plurality of capacities been used in connection with a switch selective of several current sources and connected with said switch so as to be thrown in to furnish a total capacity calculated to balance the selected source of current.

Having described the object and preferred construction of my invention I claim:

In combination—a circuit breaker, a multiple point switch selective of different sources of operating current and a plurality of condenser capacities designed to balance said sources of current; one side of all said condenser capacities and the opposite side of one condenser capacity connected in shunt to said circuit breaker, the opposite side of the remaining condenser capacity being connected to that point of the switch in circuit with the source of current which said capacity is designed to balance.

GEORGE PARKER.

Witnesses:
  HARRY R. REA,
  M. B. WILLIAMS.